UNITED STATES PATENT OFFICE.

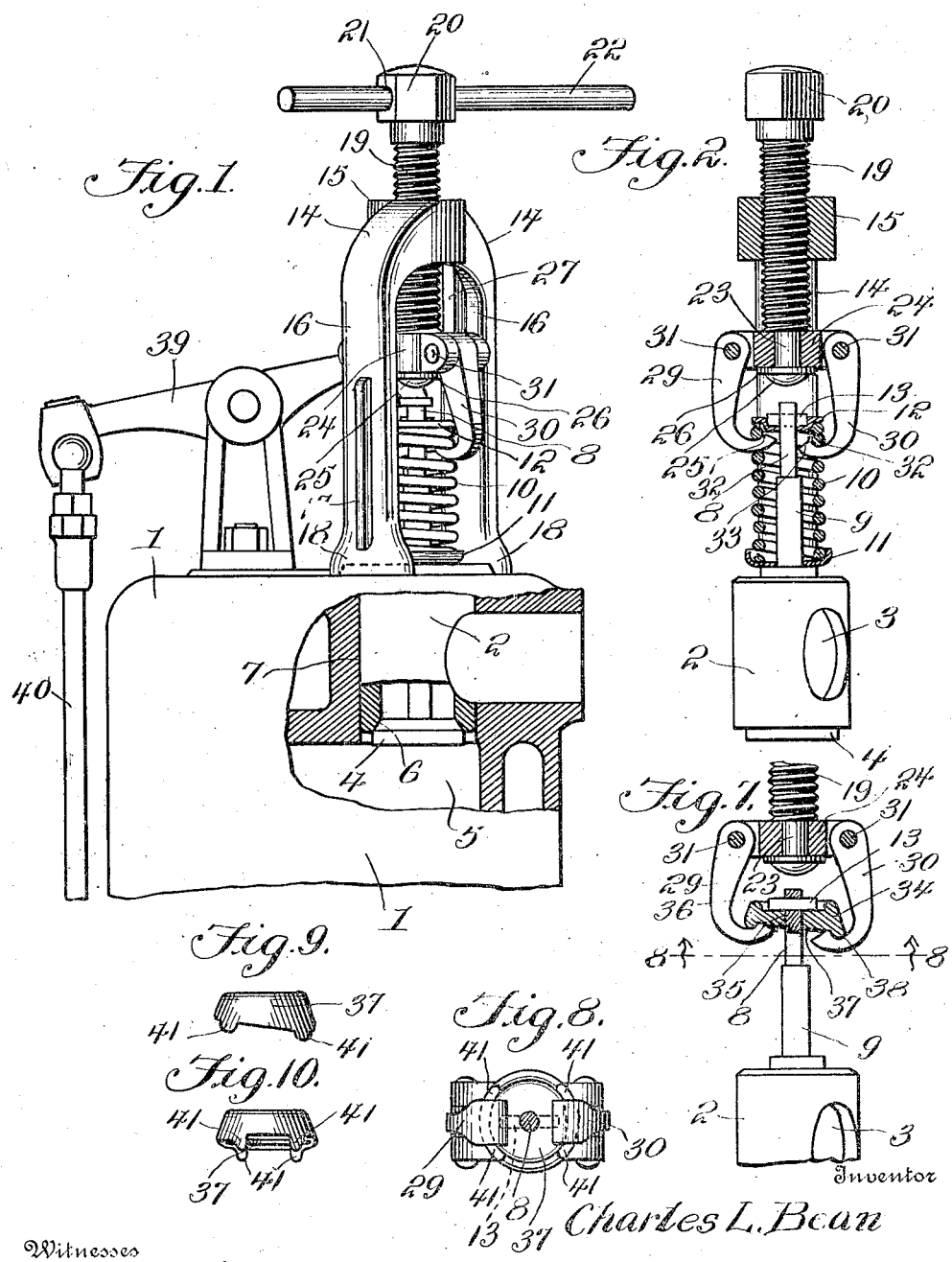

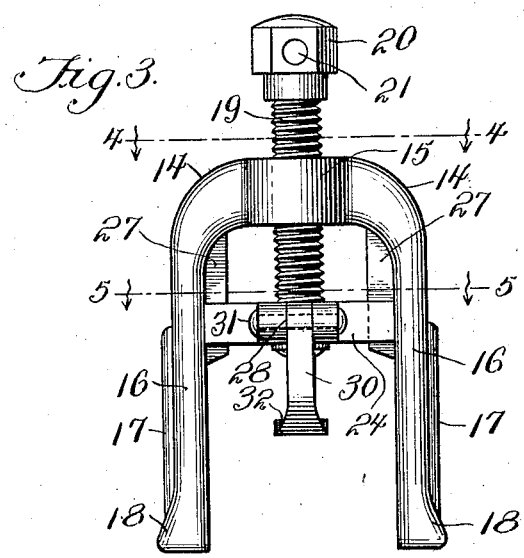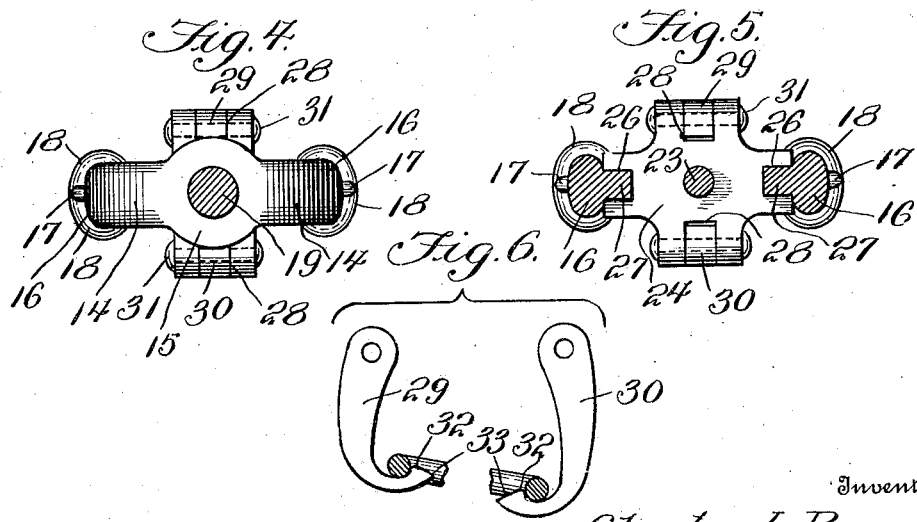

CHARLES L. BEAN, OF SAN JOSE, CALIFORNIA.

VALVE-ASSEMBLY REMOVER.

1,212,003.

Specification of Letters Patent.

Patented Jan. 9, 1917.

Application filed July 19, 1916. Serial No. 110,114.

*To all whom it may concern:*

Be it known that I, CHARLES L. BEAN, a citizen of the United States, residing at San Jose, in the county of Santa Clara and State of California, have invented new and useful Improvements in Valve-Assembly Removers, of which the following is a specification.

This invention relates to valve assembly removers, the object in view being to provide a valve removing device which is particularly adapted for use in removing the valve assemblies of engines of the valve in the head type as well as other engines in which the valve assembly is removable, said assembly consisting of the valve, the valve cage, the valve closing spring, and other minor parts intimately associated therewith.

A further object in view is to provide a special form of cap which is applicable to the valve stem and adapted to be engaged by certain elements or parts of the valve remover, enabling a considerable pulling force to be applied to the valve stem, sufficient to draw the valve cage from its normal position and seat in the head or body of the cylinder of an internal combustion engine.

With the above and other objects in view, the invention consists in the novel construction, combination and arrangement, herein fully described, illustrated and claimed.

In the accompanying drawings:—Figure 1 is an elevation partly in section showing one of the cylinders of an internal combustion engine, and the valve assembly remover of this invention in its applied relation to said cylinder and valve assembly. Fig. 2 is a vertical longitudinal section through the valve assembly remover, showing certain parts in elevation and also showing the relation between the remover and the valve assembly. Fig. 3 is an elevation of the valve assembly remover. Fig. 4 is a section on the line 4—4 of Fig. 3 looking downwardly. Fig. 5 is a section on the line 5—5 of Fig. 3 looking downwardly. Fig. 6 is a detail view showing the two claws and the relation thereof to one of the convolutions of the valve spring. Fig. 7 is a detail view partly in elevation and partly in section showing the special form of cap used in conjunction with the claws. Fig. 8 is a section on the line 8—8 of Fig. 7 looking upwardly. Fig. 9 is a side elevation of the cap. Fig. 10 is a bottom perspective view of the cap.

Referring to the drawings 1 designates an engine cylinder, 2 one of the cages of a valve assembly, said cage being provided with the usual ports 3 and 4, the latter designating the port which communicates directly with the combustion chamber 5 of the cylinder and which is controlled by the inlet or exhaust valve as the case may be. The valve cage 2 is shown as seated in an opening 7 in the cylinder head and the stem 8 of the valve extends through the valve cage and projects beyond the same being longitudinally movable in a guide 9 consisting of a tubular extension of the valve cage.

10 represents the usual valve closing spring, one end of which is sustained by a cup 11 adjacent to the cage 2 and the other end by a cupped washer or cap 12 which is held in place on the valve stem 8 by means of a pin or key 13.

All of the parts thus far described are of the ordinary construction and arrangement now in common use in engines of the valve in the head type.

The valve assembly remover of this invention, comprises a substantially U shaped frame 14 which is inverted when in its operative position, said frame comprising the arched crown or top 15 and substantially parallel legs 16 which are shown as provided on their outer sides with reinforcing ribs 17 while the extremities of the legs are enlarged to form supporting feet 18. The distance between the legs 16 is such that the frame 14 may straddle the valve assembly and rest directly upon the body of the cylinder as clearly shown in Fig. 1.

The jack screw 19 is threaded through the top of crown portion 15 of the frame 14 and is preferably formed at its outer end with a nut shaped head 20 in order that said screw 19 may be turned by means of a wrench. The head 20 is also formed with an opening 21 extending through the same for the purpose of receiving a rod or handle bar 22 by means of which the screw 19 may be turned.

At its inner end the screw 19 is reduced to form a journal 23 upon which is mounted a cross head 24 which is fastened on the journal 23 by means of a head 25, 26 designating a washer interposed between the head 25 and the cross head 24, leaving the latter free to turn in relation to the jack screw 19.

In order to prevent the cross head 24 from turning, the latter is provided at opposite sides with guide ways 26 while the legs 16 are provided along their inner side with guides 27 shown in the form of longitudinally extending ribs which fit into the guide ways 26 of the cross head as best shown in Fig. 5. The cross head is provided with slots 28 to pivotally receive a pair of claws 29 and 30, such claws being connected to the cross head 24 by means of pivots 31. The claws 29 and 30 are of different lengths for a purpose clearly shown in Figs. 2 and 6 in order that the extremities of the claws may engage the convolutions of the spring 10 at diametrically opposite points. The extremity or free end portion of each claw 29 and 30 is preferably increased in width as shown in Fig. 8 so as to give a broader bearing against the spring 10 and, as shown in Fig. 6, each claw adjacent to the extremity thereof is formed with a swelled portion or shoulder 32, to prevent slippage between the claws and the spring. Each of the claws is also pointed or brought to an entering edge as indicated at 33 to facilitate inserting the extremities of the claws between the convolutions of the spring.

34 designates a special cap to be used in conjunction with the valve assembly remover, said cap being formed with a center opening 35 to receive the valve stem 8 and being formed on the outer face thereof with an annular rib 36 to prevent accidental dislocation of the key 13 during the removing operation. As shown in Fig. 7, the cap 38 has an inclined inner face 37 which is encircled by an annular rib 38 adapted to be engaged by the free end portions of the claws 29 and 30 after the spring 10 has been removed.

39 designates one of the valve operating rocker arms and 40 one of the cam actuated rocker operating rods, the parts 39 and 40 being arranged and operated in a manner well understood by those familiar with the art to which this invention relates.

From the foregoing description taken in connection with the accompanying drawings, the operation of the device will now be understood. To remove a valve assembly, the respective rocker arm 39 is first removed, together with the nut which usually overlies the valve cage 2 and has threaded connection with the body of the cylinder but which is not shown in the drawings. The valve assembly remover is then placed over the valve space as shown in Fig. 1 with the legs 16 in contact with the cylinder at opposite sides of the valve assembly. The claws 29 and 30 are then brought into the relation of the spring 10 as shown in Fig. 2. The jack screw 19 is then backed outwardly thereby exerting a pull on the spring 10, the cap 12 of the valve stem 8 also the valve 6 and the valve cage 2. Ordinarily the cap 12 is comparatively thin and in some cases may break when a considerable pulling force is exerted thereon. In such event, the cap 12 is removed by first removing the key 13, and the spring 10 is also removed. Then, the cap 34 is placed on the stem 8 and secured by the key 13 in the manner shown in Fig. 7. The claws 29 and 30 are then engaged directly with the cap 34 which is of sufficient thickness and strength to withstand any pulling strain necessary to draw the valve cage from its seat in the body or head of the cylinder.

The device hereinabove described is particularly advantageous in that a direct pull is obtained on the valve assembly in line with the axis of the valve stem thereby avoiding all liability of bending the spring and valve stem which now frequently occurs when the ordinary iron bars, levers, screw drivers and the like are inserted between the coils of the spring for the purpose stated. To guard against any lateral slippage of the claws 29 and 30 in relation to the cap 34, said cap may be provided on its inner face with lugs 41 in such spaced relation to each other as to lie between the expanded end portions of said claws, the relation of said parts just referred to being illustrated in Fig. 8.

What is claimed is:—

1. A valve assembly remover comprising an inverted U-shaped frame, a jack screw threaded through said frame, a non-rotary cross head having said jack screw journaled therein and guided in a rectilinear path by said frame, said cross being actuated by said jack screw, and hooked claws of different lengths connected by pivots to said cross head to swing toward and away from each other, said frame embodying legs which extend below said claws.

2. A valve assembly remover comprising an inverted U-shaped frame, a jack screw threaded through said frame, a non-rotary cross-head guided by said frame and having said jack screw journaled therein, claws of different lengths pivotally carried by said cross-head and having hook shaped free ends and a valve stem embracing cap having an annular flange with which the free ends of the claws engage.

3. A valve assembly remover comprising an inverted U-shaped frame, a jack screw threaded through said frame, a non-rotary cross-head guided by said frame and having said jack screw journaled therein, claws of different lengths pivotally carried by said cross-head and having hook shaped free ends and a valve stem embracing cap having an annular flange with which the free ends of the claws engage, and also having lugs between which the free ends of the claws are received.

In testimony whereof I affix my signature.

CHARLES L. BEAN.